US010127595B1

(12) United States Patent
Hipschman et al.

(10) Patent No.: US 10,127,595 B1
(45) Date of Patent: Nov. 13, 2018

(54) CATEGORIZATION OF ITEMS BASED ON ATTRIBUTES

(71) Applicant: Square, Inc., San Francisco, CA (US)

(72) Inventors: Daniel Hipschman, San Francisco, CA (US); James F. Butts, III, San Francisco, CA (US); Zachary Brock, San Francisco, CA (US); Abhay Raj Kumar, San Francisco, CA (US); Matthew O'Connor, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 14/587,758

(22) Filed: Dec. 31, 2014

(51) Int. Cl.
*G06Q 30/00* (2012.01)
*G06Q 50/00* (2012.01)
*G06Q 30/06* (2012.01)
*G06Q 50/12* (2012.01)

(52) U.S. Cl.
CPC ..... *G06Q 30/0629* (2013.01); *G06Q 30/0635* (2013.01); *G06Q 30/0639* (2013.01); *G06Q 50/12* (2013.01)

(58) Field of Classification Search
None
See application file for complete search history.

(56) References Cited

U.S. PATENT DOCUMENTS

| 6,646,659 B1 | 11/2003 | Brown et al. | |
|---|---|---|---|
| 6,839,682 B1 | 1/2005 | Blume et al. | |
| 7,024,205 B1 | 4/2006 | Hose | |
| 7,324,958 B2 | 1/2008 | Miyazaki et al. | |
| 7,407,089 B2 | 8/2008 | Patrick | |
| 7,680,690 B1 | 3/2010 | Catalano | |
| 7,730,151 B1 | 6/2010 | Fabbri et al. | |
| 7,848,765 B2 * | 12/2010 | Phillips et al. | 455/456.3 |
| 7,970,418 B2 * | 6/2011 | Schmidt et al. | 455/456.5 |
| 8,001,044 B2 | 8/2011 | Davis | |

(Continued)

FOREIGN PATENT DOCUMENTS

| DE | 20 2012 100 620 U1 | 8/2012 |
|---|---|---|
| WO | 2015/066056 A1 | 5/2015 |
| WO | 2016/094500 A2 | 6/2016 |

OTHER PUBLICATIONS

U.S. Appl. No. 14/587,866, Kumar, A. R., et al., filed Dec. 31, 2014.

(Continued)

*Primary Examiner* — Fateh M Obaid
(74) *Attorney, Agent, or Firm* — Polsinelli PC—Square

(57) ABSTRACT

Item-level information of a particular item may be processed to categorize the particular item. In some instances, the particular item may be ranked across multiple merchants that are offering the particular item for acquisition. The ranking may be based on the item-level information that relates to an attribute of the particular item for the individual merchants. For example, the item-level information may include a cost of the particular item at a merchant, a rating of the particular item for a merchant, a number of calories of the particular item for a merchant, and so on. Information regarding the ranking may be displayed or otherwise output to enable the user to identify and order the particular item from a merchant that satisfies the user's needs.

20 Claims, 9 Drawing Sheets

(56) References Cited

U.S. PATENT DOCUMENTS

| | | | |
|---|---|---|---|
| 8,065,080 B2* | 11/2011 | Koch | 701/540 |
| 8,200,247 B1* | 6/2012 | Starenky et al. | 455/456.3 |
| 8,229,458 B2* | 7/2012 | Busch | 455/456.1 |
| 8,417,377 B2 | 4/2013 | Rothschild | |
| 8,504,073 B2* | 8/2013 | Svendsen et al. | 455/456.3 |
| 8,635,157 B2 | 1/2014 | Smith et al. | |
| 8,645,366 B1* | 2/2014 | Acharya | 707/723 |
| 8,756,187 B2* | 6/2014 | Wilson et al. | 706/46 |
| 8,892,249 B2 | 11/2014 | Holman et al. | |
| 8,898,288 B2* | 11/2014 | Petersen et al. | 709/224 |
| 8,918,355 B2 | 12/2014 | Perrier et al. | |
| 9,218,633 B2 | 12/2015 | Hulett et al. | |
| 9,334,150 B1 | 5/2016 | Ost et al. | |
| 9,589,290 B1 | 3/2017 | Hipschman et al. | |
| 9,779,446 B1 | 10/2017 | Hipschman et al. | |
| 2002/0059147 A1 | 5/2002 | Ogasawara | |
| 2002/0065728 A1 | 5/2002 | Ogasawara | |
| 2002/0174010 A1 | 11/2002 | Rice, III | |
| 2003/0061109 A1 | 3/2003 | Banerjee et al. | |
| 2003/0069780 A1 | 4/2003 | Hailwood et al. | |
| 2003/0078873 A1 | 4/2003 | Cohen | |
| 2003/0204447 A1 | 10/2003 | Dalzell et al. | |
| 2004/0093281 A1 | 5/2004 | Silverstein et al. | |
| 2004/0236696 A1 | 11/2004 | Aoki et al. | |
| 2004/0249497 A1 | 12/2004 | Saigh et al. | |
| 2006/0010037 A1 | 1/2006 | Angert et al. | |
| 2006/0143073 A1 | 6/2006 | Engel et al. | |
| 2006/0200305 A1 | 9/2006 | Sheha et al. | |
| 2007/0088624 A1 | 4/2007 | Vaughn et al. | |
| 2007/0150375 A1 | 6/2007 | Yang | |
| 2007/0203801 A1 | 8/2007 | Istfan | |
| 2007/0281689 A1* | 12/2007 | Altman et al. | 455/435.1 |
| 2008/0104199 A1 | 5/2008 | Kalaboukis | |
| 2008/0154781 A1 | 6/2008 | Kumar | |
| 2008/0294751 A1 | 11/2008 | Dreiling | |
| 2009/0005987 A1 | 1/2009 | Vengroff et al. | |
| 2009/0006156 A1 | 1/2009 | Hunt et al. | |
| 2009/0063312 A1 | 3/2009 | Hurst | |
| 2009/0204492 A1 | 8/2009 | Scifo et al. | |
| 2009/0307096 A1 | 12/2009 | Antonellis | |
| 2010/0114654 A1 | 5/2010 | Lukose et al. | |
| 2010/0184416 A1* | 7/2010 | Gupta et al. | 455/414.3 |
| 2010/0274597 A1 | 10/2010 | Dill | |
| 2010/0312385 A1 | 12/2010 | Deuber | |
| 2011/0125566 A1 | 5/2011 | McLaughlin et al. | |
| 2011/0201317 A1* | 8/2011 | Karandikar et al. | 455/414.1 |
| 2011/0238474 A1 | 9/2011 | Carr et al. | |
| 2011/0256881 A1 | 10/2011 | Huang et al. | |
| 2011/0260860 A1 | 10/2011 | Gupta | |
| 2011/0313867 A9 | 12/2011 | Silver | |
| 2012/0078673 A1 | 3/2012 | Koke et al. | |
| 2012/0127490 A1 | 5/2012 | Ogasawara et al. | |
| 2012/0156337 A1 | 6/2012 | Studor et al. | |
| 2012/0276928 A1 | 11/2012 | Shutter | |
| 2012/0284769 A1 | 11/2012 | Dixon et al. | |
| 2012/0295639 A1* | 11/2012 | Fitoussi et al. | 455/456.3 |
| 2013/0024375 A1 | 1/2013 | Choudhuri et al. | |
| 2013/0024376 A1 | 1/2013 | Choudhuri et al. | |
| 2013/0030955 A1 | 1/2013 | David | |
| 2013/0035114 A1* | 2/2013 | Holden et al. | 455/456.3 |
| 2013/0040663 A1* | 2/2013 | Gold | 455/456.3 |
| 2013/0151380 A1 | 6/2013 | Holt | |
| 2013/0169046 A1 | 7/2013 | Shin et al. | |
| 2013/0178233 A1 | 7/2013 | McCoy et al. | |
| 2013/0218991 A1* | 8/2013 | McConnell et al. | 709/206 |
| 2013/0297321 A1* | 11/2013 | Raux et al. | 704/275 |
| 2013/0311315 A1 | 11/2013 | Zises | |
| 2014/0012806 A1* | 1/2014 | Ching et al. | 707/609 |
| 2014/0045516 A1 | 2/2014 | Turgman et al. | |
| 2014/0058902 A1 | 2/2014 | Taylor et al. | |
| 2014/0074610 A1 | 3/2014 | Bilange | |
| 2014/0108177 A1 | 4/2014 | Erke et al. | |
| 2014/0195454 A1 | 7/2014 | Richie et al. | |
| 2014/0279123 A1 | 9/2014 | Harkey et al. | |
| 2014/0289071 A1 | 9/2014 | Fox et al. | |
| 2014/0289073 A1* | 9/2014 | Gold | 705/26.9 |
| 2014/0297470 A1 | 10/2014 | Ramadge et al. | |
| 2014/0359510 A1 | 12/2014 | Graf et al. | |
| 2014/0379578 A1* | 12/2014 | Chan et al. | 705/44 |
| 2015/0039462 A1* | 2/2015 | Shastry et al. | 705/26.7 |
| 2015/0120509 A1 | 4/2015 | Moring et al. | |
| 2015/0142604 A1 | 5/2015 | Kneen | |
| 2015/0254699 A1 | 9/2015 | Bondesen et al. | |
| 2015/0262244 A1 | 9/2015 | Rados et al. | |
| 2015/0304806 A1 | 10/2015 | Vincent | |
| 2016/0071050 A1 | 3/2016 | Kaye | |
| 2016/0125506 A1 | 5/2016 | Carr et al. | |
| 2016/0169696 A1 | 6/2016 | Butts, III et al. | |
| 2017/0011450 A1 | 1/2017 | Frager et al. | |
| 2017/0270573 A1 | 9/2017 | Kim et al. | |

OTHER PUBLICATIONS

Non-Final Office Action mailed Feb. 9, 2017, for U.S Appl. No. 14/587,866, of Kumar, A.R., et al., filed Dec. 31, 2014.

Non-Final Office Action dated Jan. 10, 2018, for U.S. Appl. No. 14/587,866, of Kumar, A.R., et al., filed Dec. 31, 2014.

Final Office Action dated Aug. 8, 2017, for U.S. Appl. No. 14/587,866, of Kumar, A.R., et al., filed Dec. 31, 2014.

Non-Final Office Action dated Apr. 2, 2015, for U.S. Appl. No. 14/587,984, of Hipschman, D., et al., filed Dec. 31, 2014.

Final Office Action dated Sep. 25, 2015, for U.S. Appl. No. 14/587,984, of Hipschman, D., et al., filed Dec. 31, 2014.

Non-Final Office Action dated Oct. 7, 2015, for U.S. Appl. No. 14/587,913, of Hipschman, D., et al., filed Dec. 31, 2014.

Advisory Action dated Feb. 19, 2016, for U.S. Appl. No. 14/587,984, of Hipschman, D., et al., filed Dec. 31, 2014.

Non-Final Office Action dated Apr. 4, 2016, for U.S. Appl. No. 14/587,984, of Hipschman, D., et al., filed Dec. 31, 2014.

Non Final Office Action dated Sep. 8, 2016, for U.S. Appl. No. 14/587,913, of Hipschman, D., et al., filed Dec. 31, 2014.

Notice of Allowance dated Oct. 13, 2016, for U.S. Appl. No. 14/587,984, of Hipschman, D., et al., filed Dec. 31, 2014.

Advisory Action dated Dec. 12, 2016, for U.S. Appl. No. 14/587,913, of Hipschman, D., et al., filed Dec. 31, 2014.

Non-Final Office Action dated Feb. 23, 2017, for U.S. Appl. No. 14/311,176, of Moring, M.D., et al., filed Jun. 20, 2014.

Non-Final Office Action dated Mar. 9, 2017, for U.S. Appl. No. 14/588,044, of Hipschman, D., et al., filed Dec. 31, 2014.

Non-Final Office Action dated May 19, 2017, for U.S. Appl. No. 14/464,276, of Johnson, L., et al., filed Aug. 20, 2014.

Notice of Allowance dated May 23, 2017, for U.S. Appl. No. 14/587,913, of Hipschman, D., et al., filed Dec. 31, 2014.

Final Office Action dated Jul. 20, 2017, for U.S. Appl. No. 14/588,044, of Hipschman, D., et al., filed Dec. 31, 2014.

Final Office Action dated Aug. 10, 2017, for U.S. Appl. No. 14/311,176, of Moring, M.D., et al., filed Jun. 20, 2014.

Final Office Action dated Nov. 24, 2017, for U.S. Appl. No. 14/464,276, of Johnson, L., et al., filed Aug. 20, 2014.

Non-Final Office Action dated Jan. 29, 2018, for U.S. Appl. No. 14/568,905, of Butts, J.F., et al., filed Dec. 12, 2014.

Non-Final Office Action dated Feb. 13, 2018, for U.S. Appl. No. 14/311,176, of Moring, M.D., et al., filed Jun. 20, 2014.

Non-Final Office Action dated Apr. 9, 2018, for U.S. Appl. No. 14/588,044, of Hipschman, D., et al., filed Dec. 31, 2014.

Non-Final Office Action dated Apr. 20, 2018, for U.S. Appl. No. 14/464,276, of Johnson, L., et al., filed Aug. 20, 2014.

International Search Report and Written Opinion for International Application No. PCT/US2014/062697, dated Feb. 10, 2015.

International Search Report and Written Opinion for PCT Application No. PCT/US2015/064671 dated Feb. 23, 2016.

Extended European Search Report for European Patent Application No. 15867710.4, dated Sep. 14, 2017.

* cited by examiner

CATEGORIZATION OF ITEMS BASED ON ATTRIBUTES

BACKGROUND

Users often seek to find merchants, such as restaurants, gas stations, hotels, and so on, that are located within proximity to the users. These users may utilize online websites or mobile applications to search through various merchants that might satisfy their needs. The websites and mobile applications provide a map or list of merchants that may be of interest to the users. For example, a user desiring to order food for delivery, may search with a mobile application and view a map of restaurants that are located within a 0.2 mile radius of the user. Having identified a merchant, the user may call the restaurant to place an order for delivery of the food to the user's location. However, users often spend relatively large amounts of time sifting through the merchants that are identified by these websites and mobile applications to find merchants that satisfy their needs.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
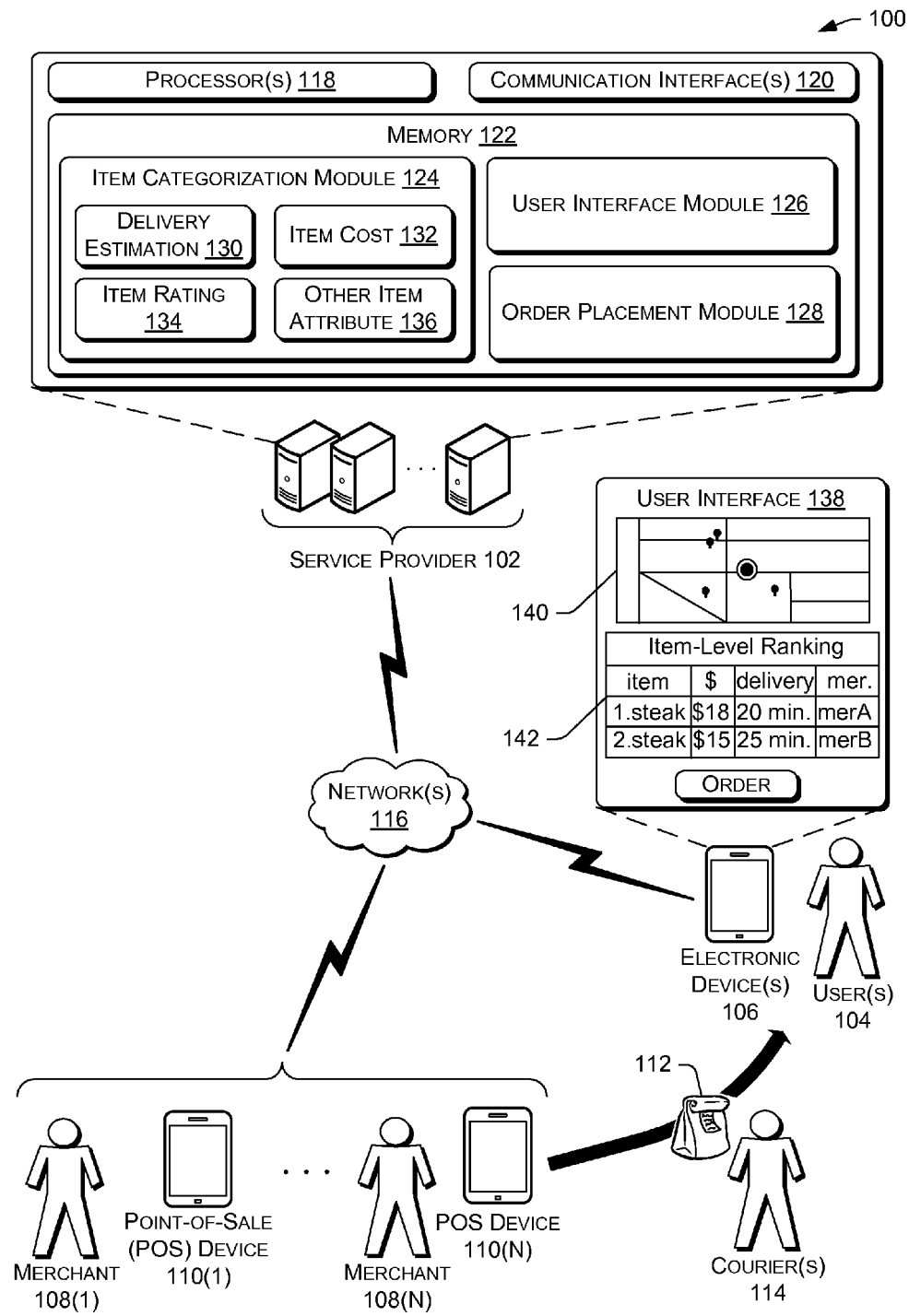
FIG. 1 illustrates an example environment for processing item-level information to categorize a specified item for multiple merchants.

Some implementations described herein include techniques and arrangements for processing item-level information to categorize a specified item. In some instances, the techniques may rank a particular item across multiple merchants that are offering the particular item for acquisition. The ranking may be based on item-level information for individual merchants, such as an amount of time a merchant takes to prepare the particular item, an amount of time a courier takes to transport the particular item, a cost of the particular item, a rating of the particular item, a number of calories of the particular item, and so on. Information regarding the ranking may then be displayed or otherwise output to enable the user to identify and order the particular item from a merchant that satisfies the user's needs. As such, the techniques may enhance the user's experience by accounting for item-level information.

In some instances, a service provider may communicate with an electronic device of a user to enable the user to place an order for a particular item. The user may employ the electronic device to request information regarding merchants that offer a particular item for acquisition. For example, a user may interact with a smart phone to search for nearby restaurants that sells steaks. The service provider may receive the request and process item-level information to rank the particular item for merchants that are located within a predetermined proximity to the user, such as merchants within a geo-fence around the user. The item-level information may have been gathered or generated over time as transactions occur between merchants and customers. For example, the service provider may gather information from electronic devices of merchants, customers, couriers, and others as an item is ordered and delivered to the customer. However, in other instances the item-level information is gathered and/or generated from other sources.

As one example of ranking, the service provider may rank nearby restaurants that offer steaks based on a cost, rating, or other attributes of steaks at the individual restaurants. In particular, the service provider may reference transaction information or menus of two nearby steakhouses to find pricing information for steaks at Jan's Seafood and Billy's Diner. In this example, the service provider ranks a $25 steak at Billy's Diner higher than $28 steak at Jan's Seafood, since the $25 steak is priced lower than the $28 steak. Alternatively, or additionally, the service provider may reference user reviews of individual steaks at the two steakhouses to rank a three-star steak at Billy's Diner higher than a two-and-a-half-star steak at Jan's Seafood. Furthermore, the service provider may account for a number of calories of the individual steaks to rank steaks at the two steakhouses.

As another example of ranking where the user is looking for nearby steakhouses and is interested in having a steak delivered, the service provider may rank the two nearby steakhouses based on an estimated amount of delivery time for each of the steakhouses. In particular, an amount of delivery time to deliver a steak from Jan's Seafood may be estimated from a previous amount of time that was taken for Jan's Seafood to prepare a steak. Further, the estimation for Jan's Seafood may be based on a previous amount of time that was taken by a courier to obtain the steak from Jan's Seafood and to transport the steak a similar distance that the courier would travel to arrive at the user's current location (e.g., within a similarity range).

In any event, the service provider may cause information about a ranking of a particular item for each of multiple merchants to be presented via the user's electronic device. The information may be presented in a map that displays locations of the merchants, in a list of the merchants, or in any other format. For example, the information may include a list with a steak from Jan's Seafood listed higher than a steak from Billy's Diner due to an overall delivery time of the steak from Billy's Diner being less than an overall delivery time of a steak from Jan's Seafood. The user may select the particular item offered by a merchant and the service provider may place an order for the particular item with the merchant. In some instances, such as when the user has requested to have the particular item delivered, the placement of the order may cause a courier to deliver the particular item to the user's current location.

By processing item-level information, a specified item may be categorized in an intelligent manner. This may ultimately enhance the user's experience in finding items from nearby merchants. Further, the techniques may reduce the amount of input provided by the user and output to the user to search through items and merchants that are of interest to the user (e.g., avoid the user from further specifying the types of items or merchants that are of interest). This may conserve battery life and/or processing resources.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

FIG. 1 illustrates an example environment 100 for processing item-level information to categorize a specified item for multiple merchants. For example, the environment 100 may include a service provider 102 that ranks a particular item across multiple merchants that are offering the particular item for acquisition. The service provider 102 may send information regarding a ranking to one or more users 104 (hereinafter "the user 104") to assist the user 104 in identifying an item to be ordered and/or an associated merchant. In particular, the information may be sent to one or more electronic devices 106 (hereinafter "the electronic device 106") employed by the user 104. As illustrated, the environment 100 also includes a plurality of merchants 108(1)-(N) that are associated with a plurality of point-of-sale (POS) devices 110 (hereinafter "the POS device 110"). The plurality of merchants 108 may engage in various transactions of items with customers and perform other processing. In some instances, an item 112 of one of the plurality of merchants 108 may be ordered by the user 104 and delivered to the user 104 by one or more couriers 114 (hereinafter "the courier 114"). Although not illustrated, the courier 114 may be associated with an electronic device. The service provider 102, the electronic device 106, the courier 114 (an associated electronic device), and/or the POS device 110 may communicate via one or more networks 116.

A merchant may include any business engaged in the offering of goods or services for acquisition by customers. In many instances, a merchant may offer the goods or services for acquisition in exchange for compensation received from customers (e.g., users). Actions attributed to a merchant may include actions performed by employees or other agents of the merchant and, thus, no distinction is made herein between merchants and their employees unless specifically discussed. In addition, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires one or more items from a merchant, and in return, the customer provides payment to the merchant. In many instances herein, the user 104 may comprise a customer that interacts with one of the plurality of merchants 108 to acquire an item.

Each of the plurality of merchants 108 may be associated with an establishment where a transaction of an item may occur. An establishment may include any premises associated with a merchant, such as a geographical place of business (e.g., store), a residence, and so on. An establishment may include land, a building, a vehicle, or other property. In some instances, an establishment may be located at a fixed location that typically does not change on a day-to-day basis. In other instances, however, an establishment may change from time to time, such as in the case that the merchant operates a food truck, is a street vendor, a cab driver, etc., or has an otherwise mobile business (e.g., in the case of merchants who sell items at buyer's homes, places of business, and so forth).

A courier may include any person or service that delivers or transports items. A courier may include delivery persons or services associated with delivering mail, packages, messages, and so on from one location to another location. For example, a courier may deliver an item from one location of a town to another location of a town, from one city to another city, from one state to another state, and so on. As such, a courier may include a network of couriers that each handle delivery for a specific region. To illustrate, the delivery of an item to a destination may include a transfer of the item from one courier to another courier. A courier may include a company that is dedicated to delivering items or a company that is primarily dedicated to other services, but includes some courier services. In some instances, the courier 114 of FIG. 1 is associated with the service provider 102 (e.g., the courier 114 is an employee of a company that operates the service provider 102), while in other instances the courier 114 is independent of the service provider 102. Further, the courier 114 may be one of the plurality of merchants 108, or any other person or entity. In yet other examples, the courier 114 may be a customer that delivers an item for another customer. In the example environment 100, the courier 114 may generally retrieve an item from one of the plurality of merchants 108 and deliver the item to the user 104 in a packaged or unpackaged form.

The service provider 102 may include one or more computing devices, such as servers, laptop computers, desktop computers, and so on. The one or more computing devices may be configured in a cluster, a farm, a data center, a cloud computing environment, or a combination thereof. In one example, the one or more computing devices provide cloud computing resources, including computational resources, storage resources, and the like.

While FIG. 1 illustrates components and data of the service provider 102 as being present in a single location, these components and data may alternatively be distributed across different computing devices and/or different locations in any manner. Consequently, the functions may be implemented by one or more computing devices, with the various functionality described above distributed in various ways across the different computing devices. Multiple computing devices may be located together or separately, and organized, for example, as virtual servers, server banks, and/or server farms. The described functionality may be provided by the servers of a single entity or enterprise, or may be provided by the servers and/or services of multiple different buyers or enterprises.

As illustrated, the one or more computing devices of the service provider 102 may include one or more processors 118, one or more communication interfaces 120, and memory 122. Each of the one or more processors 118 may include a central processing unit (CPU), a graphics processing unit (GPU), a microprocessor, a microcomputer, a microcontroller, a state machine, logic circuitries, a digital signal processor, and so on. For instance, the one or more processors 118 may be one or more hardware processors and/or logic circuits of any suitable type specifically programmed or configured to execute the algorithms and processes described herein. Each of the one or more processors 118 may be a single processing unit or a number of processing units, and may include single or multiple computing units or multiple processing cores. The one or more processors 118 can be configured to fetch and execute computer-readable instructions stored in the memory 122, which can program the one or more processors 118 to perform the functions described herein.

The one or more communication interfaces 120 may include one or more interfaces and hardware components for enabling communication with various other devices, such as over the one or more networks 116. For example, the one or more communication interfaces 116 may enable communication through one or more of the Internet, cable networks, cellular networks, wireless networks (e.g., Wi-Fi) and wired networks, as well as close-range communications such as BLUETOOTH®, BLUETOOTH® low energy, and the like, as additionally enumerated elsewhere herein.

The memory 122 may store software functionality configured as one or more "modules." The term "module" is intended to represent example divisions of the software for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules may be implemented in whole or in part by hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc. As illustrated in FIG. 1, the memory 122 includes an item categorization module 124, a user interface (UI) module 126, and an order placement module 128.

The item categorization module 124 may process item-level information to categorize an item for one or more merchants. For example, the item categorization module 124 may receive a request from the UI module 126 for information pertaining to merchants that offer a specified item for acquisition. The item categorization module 124 may identify merchants that offer the specified item for acquisition (e.g., based on transaction information regarding previous transactions, inventory information, menus, online sources associated with the merchants, and so on). In some instances, the identified merchants may each have an establishment located within a threshold distance of a current geographical location of the electronic device 106 of the user 104. The item categorization module 124 may then rank or sort the specified item for the identified merchants based on item-level information. Example item-level information may include:

A delivery estimation 130—an estimated amount of time to deliver an item for a merchant to a location of a user. An estimated amount of time to deliver an item may include a preparation time for a merchant to prepare an item (e.g., a time to make a food dish, a time to build a product, etc.), a courier time for a courier to transport an item to a current geographical location of a user (e.g., an amount of time to travel to the merchant to obtain an item and to take the item to the user), an amount of time to package an item for shipment, an amount of time to ship an item, an amount of time to obtain elements to make an item (e.g., order and receive parts for an electronic device, obtain ingredients for a food dish, etc.), an amount of time to obtain additional inventory for an item, and so on. In some instances, the delivery estimation 130 is based on historical data, such as a previous amount of preparation time that was taken to prepare an item, a previous amount of courier time that was taken to transport an item, an average of previous preparation times or previous courier times, and so on.

An item cost 132—a cost at which an item is being offered for acquisition by a merchant (e.g., a price of an item). The item cost 132 may be obtained from transaction information that indicates a price of a transaction (e.g., in some instances the transaction information may include itemized prices), a menu (e.g., online menu for a merchant), input from a merchant indicating a price, inventory information, etc.

An item rating 134—a rating of an item for a merchant. In some instances, the item rating 134 is obtained from an online source (e.g., online user reviews or ratings of a particular food dish), a survey conducted by a merchant or another party (e.g., a survey on an electronic receipt for an item), etc.

Another item attribute 136 besides the item cost 132 or item rating 134. This may include an attribute of an item that is related to a category of the item, such as a number of calories for a food item, a number of ingredients for a food item, an electronic attribute for an electronic item (e.g., a size of a television), whether or not a food item is classified as vegetarian, vegan, or organic, and so on. In some instances, a number of calories may be obtained from a menu, online source, a calorie or food application or service, and so on.

A current location of a courier. In some instances, the service provider 102 may collect location information from a courier indicating a current location of an electronic device associated with the courier. This may allow the service provider 102 to track a location of the courier to determine when the courier has delivered an item, determine a route that is traveled by the courier, determine an amount of time to deliver an item, and so on.

Current inventory of an item for a merchant (e.g., an availability of an item). A current inventory of an item may be managed by the service provider 102 based on transaction information for the item (e.g., subtracting an item from the inventory when transaction information indicates that the item is sold).

Traffic conditions for a geographical region or route, such as traffic conditions along a route from a current location of a courier to a merchant (e.g., to retrieve an item), traffic conditions along a route from a merchant to a current location of a user, and so on.

The item categorization module 124 may determine or generate any piece of item-level information. In some instances, item-level information is specific to a particular merchant. As one example, a cost of an item may be a cost at which the item is being offered for acquisition by a particular merchant. In another example, a rating of an item may be specific to a particular merchant (e.g., a rating of a food dish for a particular restaurant). Further, in some instances the item categorization module 124 may average item-level information across merchants, for a particular merchant, across items, for a particular item, etc. As one example, an amount of time to deliver a particular item may be estimated based on an average amount of time it has taken to deliver other items a distance that is within a range of a distance will be traveled to deliver the particular item.

In some instances, the item categorization module 124 utilizes a combination of pieces of item-level information, which may be weighted, to rank an item for multiple merchants. To illustrate, the item categorization module 124 may obtain a value of a steak from a particular steakhouse by weighting a cost of the steak at the particular steakhouse and weighting a rating of the steak at the particular steakhouse with respective weighting factors (e.g., (weighting constant for cost)×cost and (weighting constant for rating)× rating). The weighted cost and weighted rating may be combined to form an overall value for the steak from the particular steakhouse. In some instances, the weighting factors are based on user preferences (e.g., based on the user indicating a preference for item rating over item cost, assigning a larger weighting to item rating than to item cost).

Further, in some instances the item categorization module 124 may normalize an item attribute for a geographical region. This normalized information may be used to rank an item. The geographical region may be defined from a boundary of a city, county, state, country, and so on. Alternatively, the geographical region may be defined from a geo-fence around a user. As one example, the item categorization module 124 may determine a range of costs at which an item is being offered for acquisition within a geographical region (e.g., determining that tomato soup is offered for anywhere between $5 and $20 for a particular city). The item categorization module 124 may then divide the range of the costs into sub-ranges of costs (e.g., divide the range of $5-20 into sub-ranges of costs —$5-10, $11-13, and $14-20). The item may be ranked for merchants according to the sub-ranges (e.g., assign a food dish into one of the following cost groups —$ if the food dish is between $5-10, $$ if the food dish is between $11-13, and $$$ if the food dish is between $14-20). In some instances, the cost group may be displayed with information pertaining to a ranking for the item (e.g., displaying $$ for a food dish that is $12 at a particular merchant).

Additionally, the item categorization module 124 may collect and analyze transaction information to generate item-level information. The transaction information may be collected from the POS device 110, the electronic device 106, and/or an electronic device associated with the courier 114. The transaction information may be maintained in the memory 122. The transaction information may include sales information for financial transactions of goods and/or services (referred to herein as items) that are conducted between merchants and buyers (e.g., customers), such as at a POS location. For example, the transaction information may indicate a date and time of a transaction, an amount of a transaction (e.g., price of an item of the transaction), a location where the transaction occurred, information identifying a user of the transaction, information identifying a merchant of the transaction, and so on. Further, in some instances the transaction information may indicate when an item was delivered by a courier to a user.

The item categorization module 124 may provide information regarding a ranking to the UI module 126 to be output via a user interface 138. The UI module 126 may generally manage input and/or output of the user interface 138, which may enable the user 104 to identify merchants for an item and to place an order for the item. In particular, the UI module 126 may cause the information regarding the ranking to be sent to the electronic device 106 to be output via the user interface 138. In this example, the user 104 has requested information for merchants that sell steaks. Further, the user has requested that the information be sorted by delivery time. Thus, the user interface 138 displays a map 140 and an item-level ranking 142 of merchants that satisfy the request from the user 104. The items listed in the item-level ranking 142 are sorted according to delivery times. Although information is displayed in this example, in other examples the information is otherwise output, such as in an audio format.

The order placement module 128 may facilitate the placement of an order from the user 104 with one of the plurality of merchants 108. This may include receiving a request to place an order (that originates from the user 104) from the UI module 126 and communicating with one of the plurality of merchants 108 to order an item on behalf of the user 104. This may also include communicating any information back to the user 104 regarding the placement of the order or tracking of the delivery of the item to the user 104. In some instances, the order placement module 128 may communicate with the courier 114 to facilitate the delivery of an item to the user 104, while in other instances such communication may come from the plurality of merchants 108. Further, the order placement module 128 may initiate payment processing for the transaction between one of the plurality of merchants 108 and the user 104.

In some instances, the service provider 102 may be associated with payment processing for transactions of items. In such instances, the service provider 102 may include a payment processing module, not illustrated in FIG. 1. The payment processing module may function to receive information regarding a transaction from one of the POS devices 110 and/or the electronic device 106, and attempt to authorize a payment instrument used to conduct the transaction. The payment processing module may then send an indication of whether the payment instrument has been approved or declined back to the POS device 110 or the electronic device 106.

Generally, when a customer and a merchant enter into an electronic payment transaction, the transaction is processed by electronically transferring funds from a financial account associated with the customer to a financial account associated with the merchant. As such, the payment processing module may communicate with one or more computing devices of a card payment network (e.g., MasterCard®, VISA®) over the one or more networks 116 to conduct financial transactions electronically. The payment processing module can also communicate with one or more computing devices of one or more banks over the one or more networks 116. For example, the payment processing module may communicate with an acquiring bank, an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

The memory 122 (as well as all other memory discussed herein) may include volatile and nonvolatile memory and/or removable and non-removable media implemented in any type of technology for storage of information, such as computer-readable instructions, data structures, program modules, or other data. Such computer-readable media may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the one or more computing devices of the service provider 102, the memory 122 may be a type of computer-readable storage media and/or may be a tangible non-transitory media to the extent that when mentioned, non-transitory computer-readable media exclude media such as energy, carrier signals, electromagnetic waves, and signals per se.

The one or more networks 116 can include any appropriate network, including a wide area network, such as the Internet; a local area network, such an intranet; a wireless network, such as a cellular network, a local wireless network, such as Wi-Fi and/or close-range wireless communications, such as BLUETOOTH® and BLUETOOTH® low energy; a wired network; or any other such network, or any combination thereof. Accordingly, the one or more networks 116 may include both wired and/or wireless communication technologies, including BLUETOOTH®, BLUETOOTH® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. Accordingly, the service computing device 102, the POS device 110, the electronic device 106, an electronic device of the courier 114, and other computing devices discussed herein are able to communicate over the one or more networks 116 using wired or wireless connections, and combinations thereof.

FIGS. 2A, 2B, 3, and 4 illustrate example user interfaces that may enable a user to view a ranking of an item for multiple merchants and to place an order for the item. The user interfaces may be displayed via a browser, an application, and so forth. In some instances, an application is implemented as a client application, such as a mobile application, desktop-based application, etc. In other instances, the application is implemented as part of a platform (e.g., a mobile platform), or within another context. In many instances, the user interfaces are provided to a user via an electronic device, such as the electronic device 106. In one example, the user interfaces are displayed within an application that includes functionality to place an order for an item and/or to cause a courier to deliver the item to a location of a user.

Figure 2A:
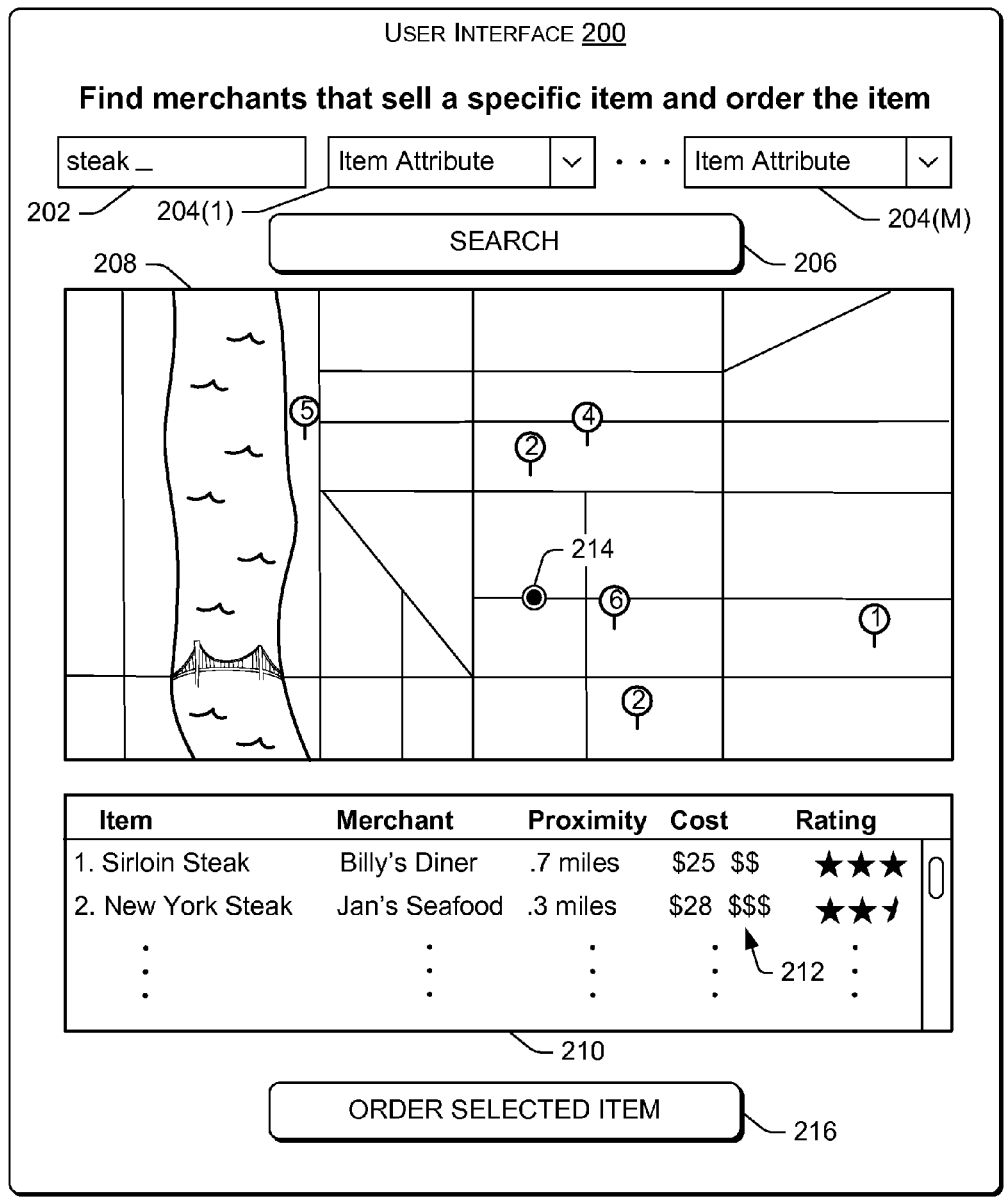
FIG. 2A illustrates an example user interface that displays information related to a ranking of an item for multiple merchants according to individual costs of the item with individual merchants.

FIG. 2A illustrates an example user interface 200 that displays information related to a ranking of an item for multiple merchants according to individual costs of the items with individual merchants. As illustrated, the user interface 200 includes an input field 202 to enable the user to search for an item. The user may also use drop-down menus 204 to specify item attributes for the search. The user may select a button 206 to search for items according to the specified input. In this example, the user has request information pertaining to restaurants that offer steak. The user requests that the information be sorted according to cost.

In response to selecting the button 206, the user interface 200 updates a map 208 and a list 210 to display information regarding restaurants that are in within a predetermined proximity to the user and that offer steak. As illustrated in the list 210, the restaurants are sorted according to cost. That is, the entry at the top of the list has the lowest priced steak (Sirloin Steak for $25 from Billy's Diner). The list 210 includes indications for the ranges of costs into which the respective entry falls. For example, the New York Steak falls into a $$$ group 212, which represents steaks between $26-30.

The map 208 displays a current location 214 of the user and a visual representation (e.g., icon) for each of the restaurants in the list 210. Here, each visual representation is located at a location of an establishment of the respective restaurant. Further, each visual representation indicates a ranking value of the respective restaurant in the list 210. The user may place an order by selecting one of the visual representations or an entry in the list 210 and then selecting a button 216. In response to selecting the button 216, an order for a steak may be placed with the selected merchant.

Figure 2B:
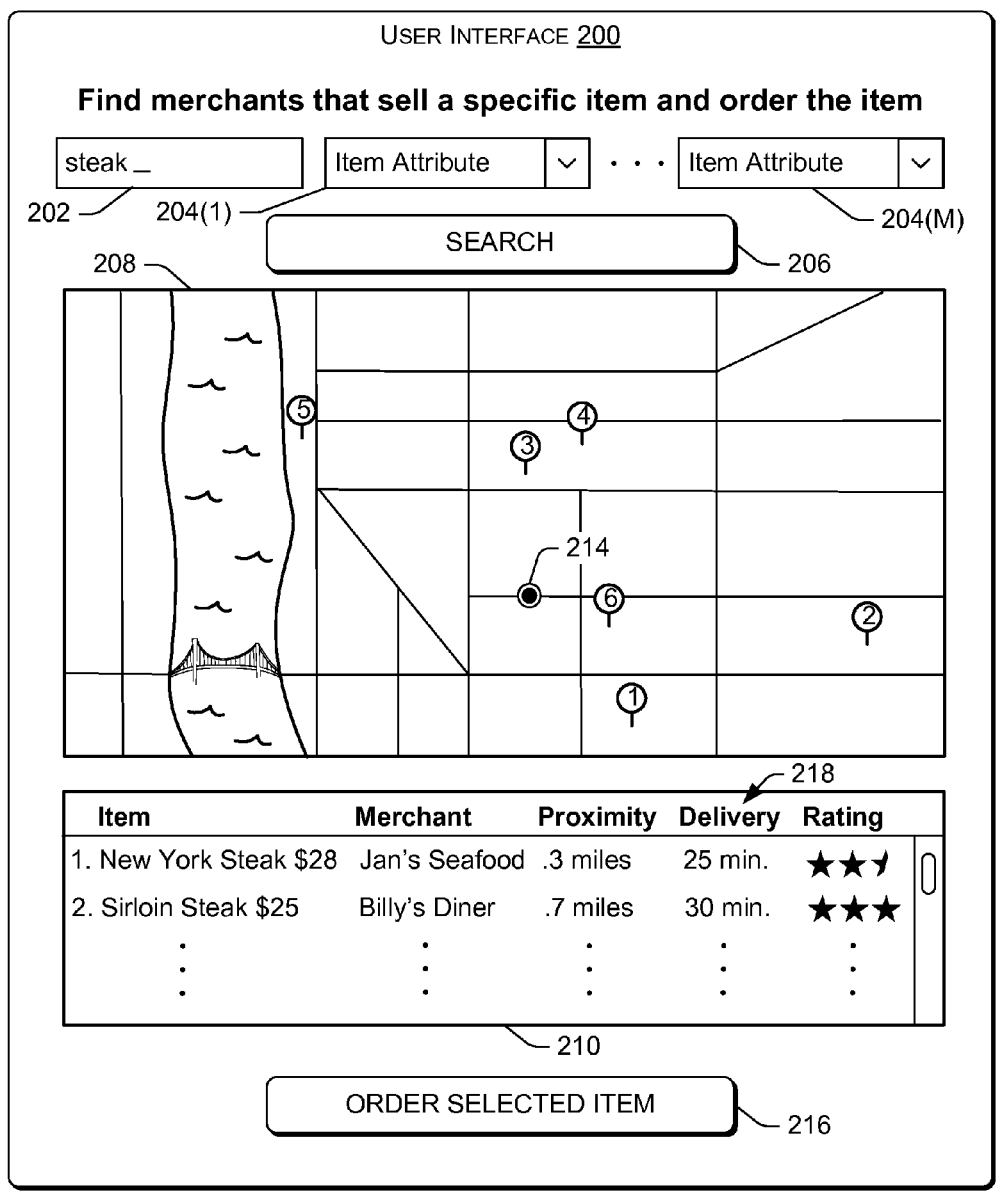
FIG. 2B illustrates an example user interface that displays information related to a ranking of an item for multiple merchants according to delivery times of the item with individual merchants.

FIG. 2B illustrates the example user interface 200 that displays information related to a ranking of an item for multiple merchants according to delivery times of the items with individual merchants. In this example, the user has requested information for a ranking according to delivery time, and accordingly, the map 208 and the list 210 are updated to rank the steak for nearby restaurants according to delivery times. As illustrated, a delivery column 218 has been added to the list 210. As also illustrated, the map 208 shows that restaurant numbered 1 has the fastest delivery time, even though a restaurant numbered 6 in the map 208 is closer to the current location 214 of the user.

Although in the examples of FIGS. 2A and 2B the rankings are according to cost and delivery, respectively, the rankings may be based on any item-level information, such as ratings, calories, etc. In one example, the user interface 200 obtains information from a calorie or food application to generate a ranking according to a number of calories of steaks from different merchants.

Figure 3:
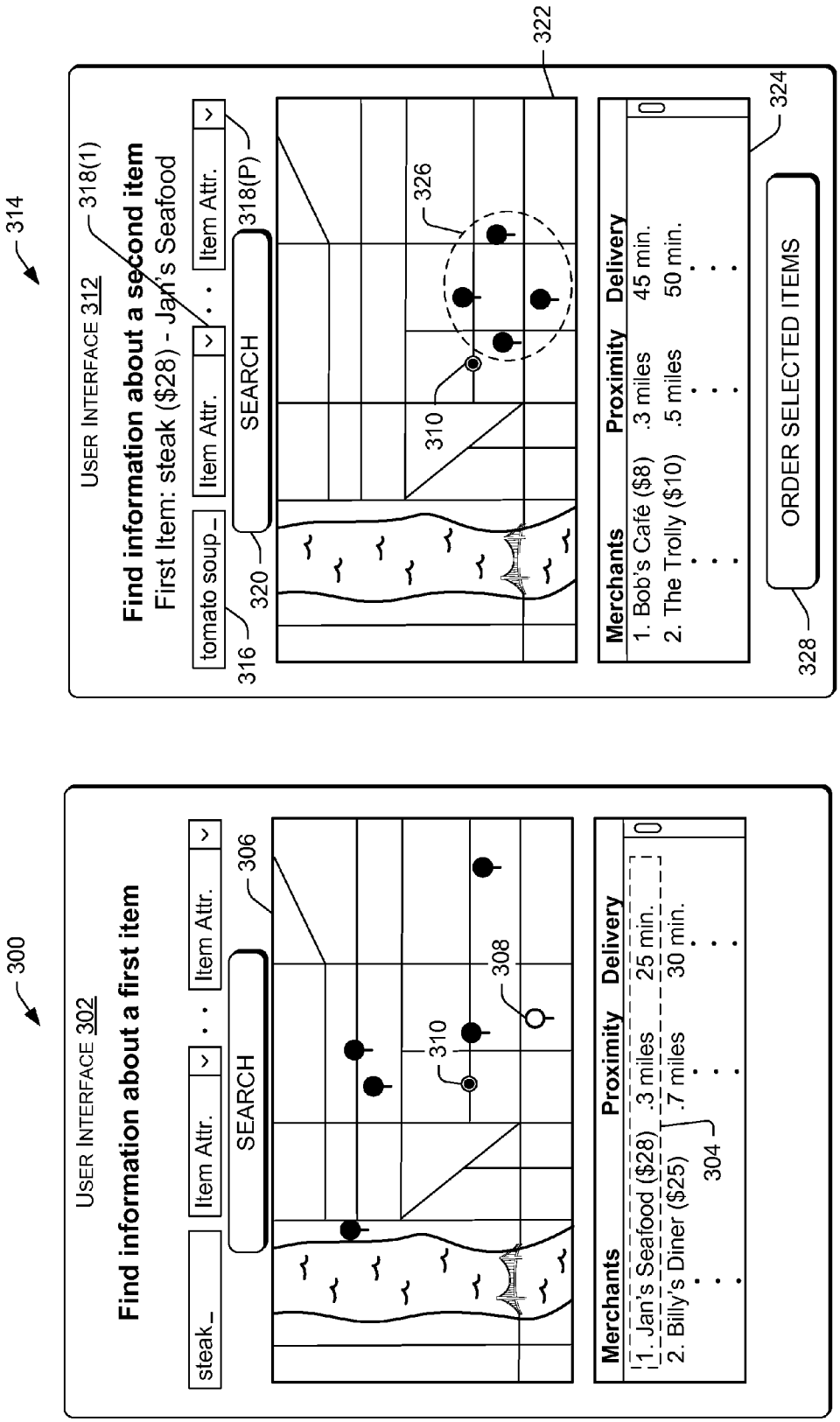
FIG. 3 illustrates example interfaces to enable a user to specify one item at a time to place an order for a combined item order.

FIG. 3 illustrates example interfaces to enable a user to specify one item at a time to place an order for a combined item order. In particular, at 300, a user interface 302 may be presented to enable the user to select a first item to be ordered. Here, the user interface 302 may display information regarding a ranking of a steak for nearby restaurants with respect to delivery times for the steak. The user interface 302 may be similar to the user interface 200 of FIG. 2B.

Through the user interface 302, the user may select a first entry 304 to be included in the combined item order. In this example, a map 306 is updated to indicate that the first entry 304 is selected. In particular, an associated visual representation 308 for a merchant of the first entry 304 is highlighted to indicate the selection. The map 306 also shows a current location 310 of the user. In the user interface 302 (and in a user interface 312), the prices of the respective entries in the list are displayed in parenthesis (e.g., the steak from Jan's Seafood costs $28).

After selecting the first entry 304, at 314 the user interface 314 may be displayed to enable the user to select a second item for the combined item order. Here, the user may provide search input in a search field 316 and specify attributes for the search item through drop-down menus 318. The user may then select a button 320 to update a map 322 and present a list 324 with information pertaining to restaurants that offer tomato soup. As noted above, this example provides rankings based on delivery times of the item. Further, the list 324 in the user interface 312 is based on the selection of the first entry 304 for the first item of the combined item order. That is, the tomato soup entries in the user interface 312 are ordered based on an amount of time to deliver the steak for the first entry 304 and the respective entry in the list 324. For example, the delivery time of 45 minutes for the first entry in the list 324 (tomato soup from Bob's Café) accounts for an amount of delivery time for the steak from Jan's Seafood (e.g., due to a proximity of Bob's Café to a delivery route for Jan's Seafood). Here, the map 322 shows merchants within a region 326 that are centered around a location of Jan's Seafood (see the highlighted visual representation 308 in the user interface 302).

The user may select a second item to add to the combined item order by selecting a visual representation in the map 322 or an entry in the list 324. Then, the user may select a button 328 to place the combined item order with the respective merchants. That is, in response to selecting the button 328, an order for the steak may be placed with Jan's Seafood and an order for the tomato soup may be placed with the associated restaurant.

Although not illustrated in FIG. 3, in some instances a suggestion to change the first item of the combined item order may be presented in the user interface 312. For example, a suggestion to use a different first item may be presented if it is determined that a change to the first item would reduce the amount of delivery time for the combined order by a particular amount. To illustrate, if all the restaurants that offer tomato soup are located in a downtown region, and the steak that is selected is not from a restaurant in the downtown region, then the user interface 312 may provide a suggestion to select a steakhouse in the downtown region in response to receiving the user input of tomato soup for the second item.

Figure 4:
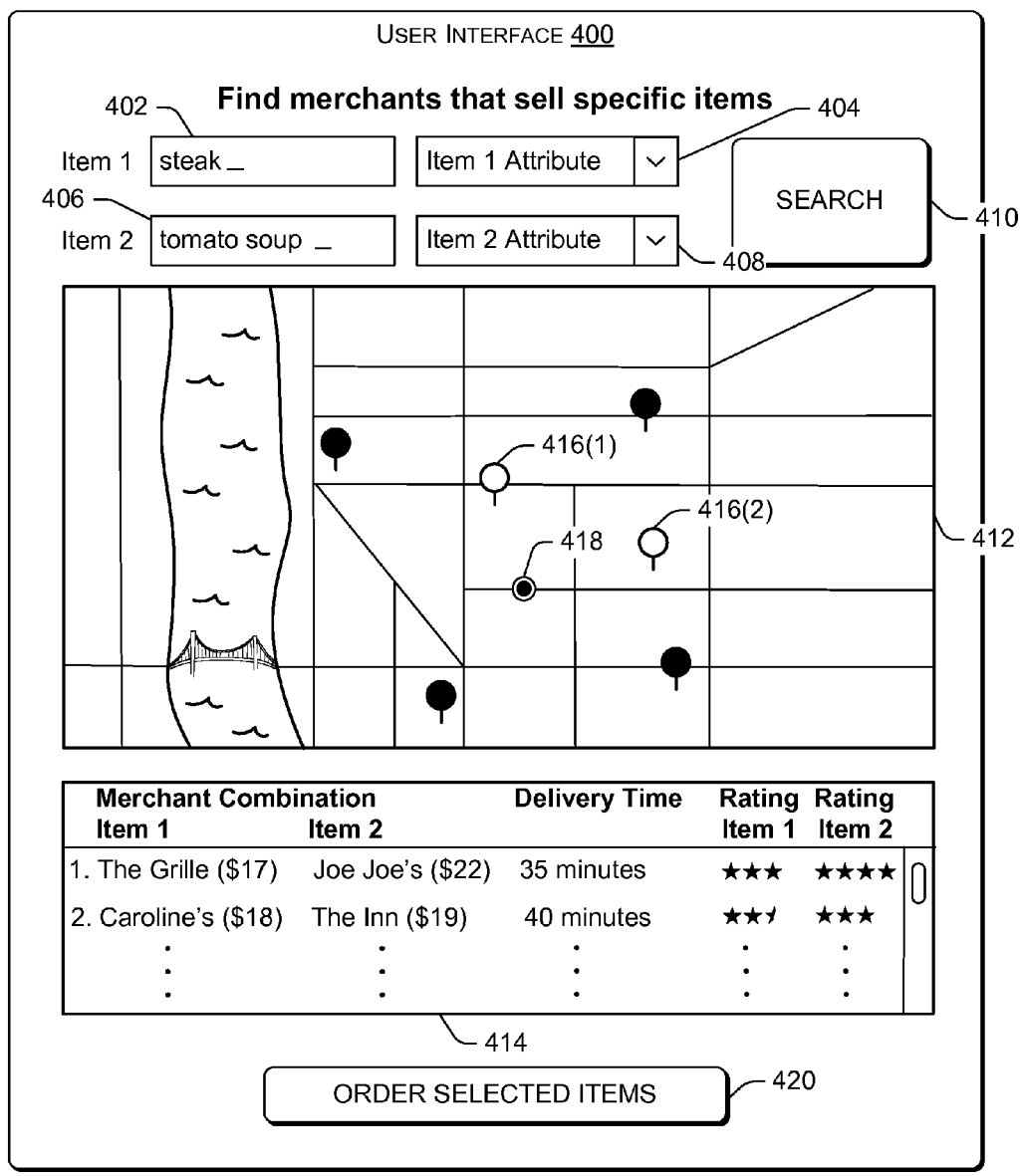
FIG. 4 illustrates an example user interface to enable a user to specify two items to place an order for a combined item order.

FIG. 4 illustrates an example user interface 400 to enable a user to input two items to place an order for a combined item order. The user interface 400 includes an input field 402 and a drop-down menu 404 to provide user input for a first item. The user interface 400 also includes an input field 406 and a drop-down 408 to provide input for a second item. Upon entering information for the first item and the second item, the user may select a button 410 to search for a best match of the first item and the second item according to the specified attribute. Here, the user has requested to sort combined item options according to a fastest delivery time.

The service provider 102 searches for restaurants that provide the lowest delivery time for the combined items. For example, the service provider 102 may reference locations of restaurants that offer steak and locations of restaurants that offer tomato soup to find the two merchants that are closets to each other or have the least amount of preparation time, in order to reduce the delivery time for the combined items. Upon finding combined item options, the user interface 400 may present information regarding the combined item options in a map 412 and a list 414. As illustrated, each entry in the list 414 identifies a first restaurant for the first item in the "Item 1" column and identifies a second restaurant for the second item in the "Item 2" column. The map 412 shows locations of restaurants for the combined item options. For example, visual representations 416 represent the first entry in the list 414 (item 1 from The Grille and item 2 from Joe Joe's). As shown, the visual representations 416 are highlighted. The map 412 also shows a current location 418 of the user.

The user may select an entry from the list 414 or the map 412 and a button 420 to place an order for the selected combined item option. This may cause an order to placed with the restaurant of the first item and an order to be placed with the restaurant of the second item. In some instances, a courier may be notified to deliver the combined item order upon selecting the button 420.

Although the user interface 400 shows different combined item options in the list 414 with no common merchants, in some instances the same merchant may be used with different combined item options. For example, the list 414 may include two entries with the same merchant for the first item.

Moreover, although in the examples of FIGS. 2A, 2B, 3, and 4 many items are ranked for multiple merchants, an item may alternatively, or additionally, be ranked for a particular merchant. For example, if a user is searching for a steak and the service provider 102 identifies a particular merchant that offers different types of steaks, the user may be presented with a list of the different types of steaks for the particular merchant. Here, the list may be ordered according to any type of item-level information, such as by price, delivery time, etc. To illustrate, the list may include a New York style steak and a Sirloin style steak for a same merchant that are sorted according to delivery time (e.g., the New York style steak taking longer to delivery due to a larger amount of preparation time).

Figure 5:
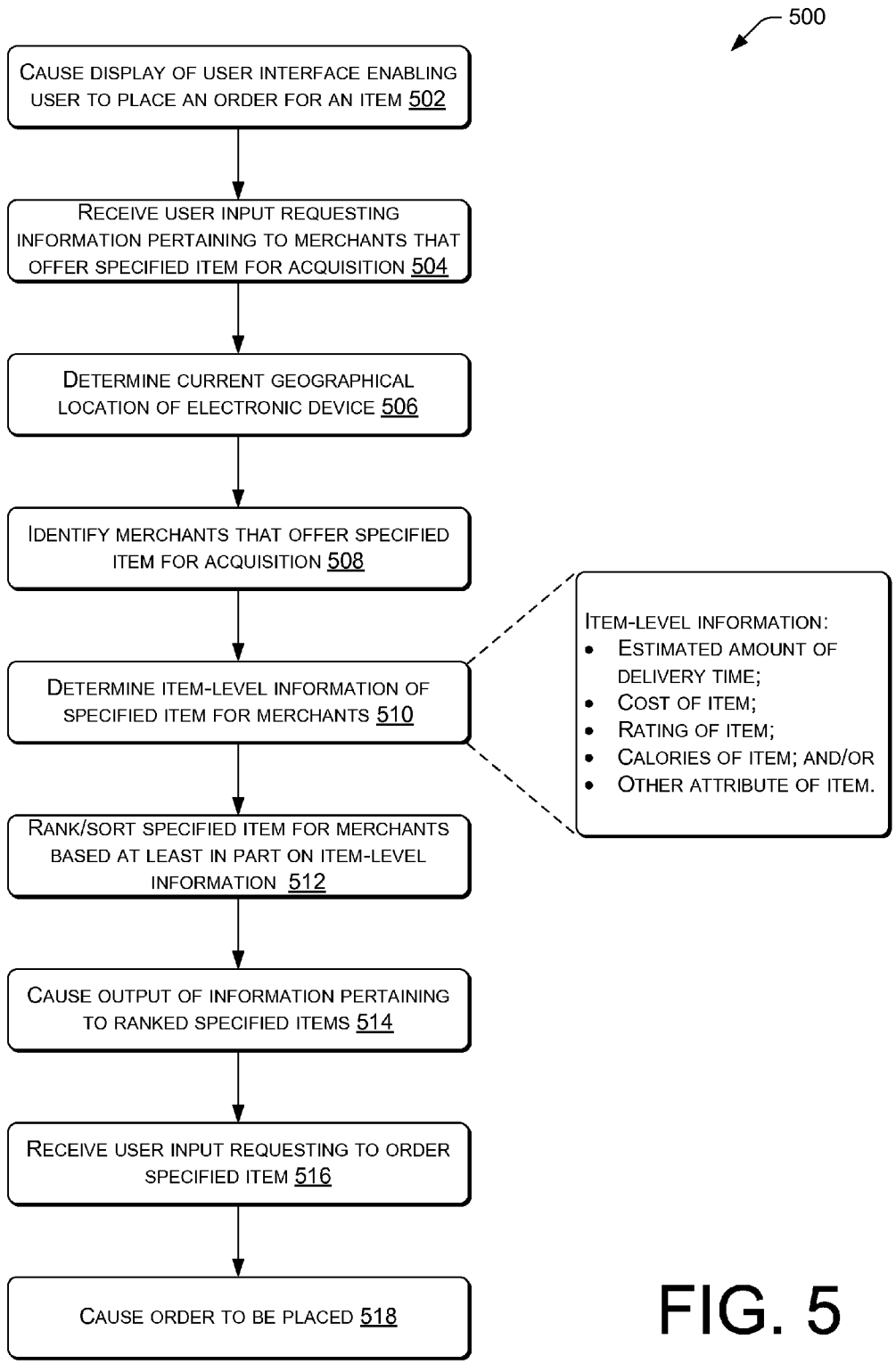
FIG. 5 illustrates an example process for ranking an item for each of multiple merchants that offer the item for acquisition.
Figure 6:
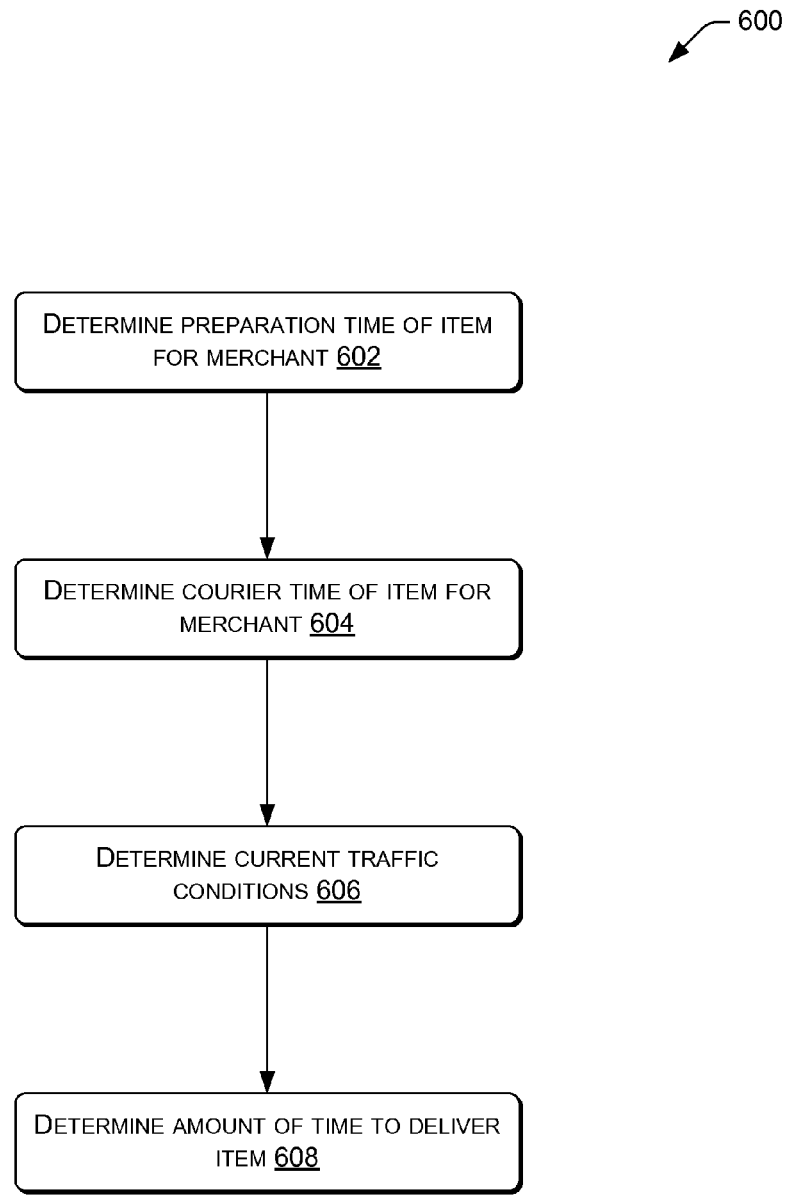
FIG. 6 illustrates an example process for determining an amount of time to deliver a specified item to a merchant.
Figure 7:
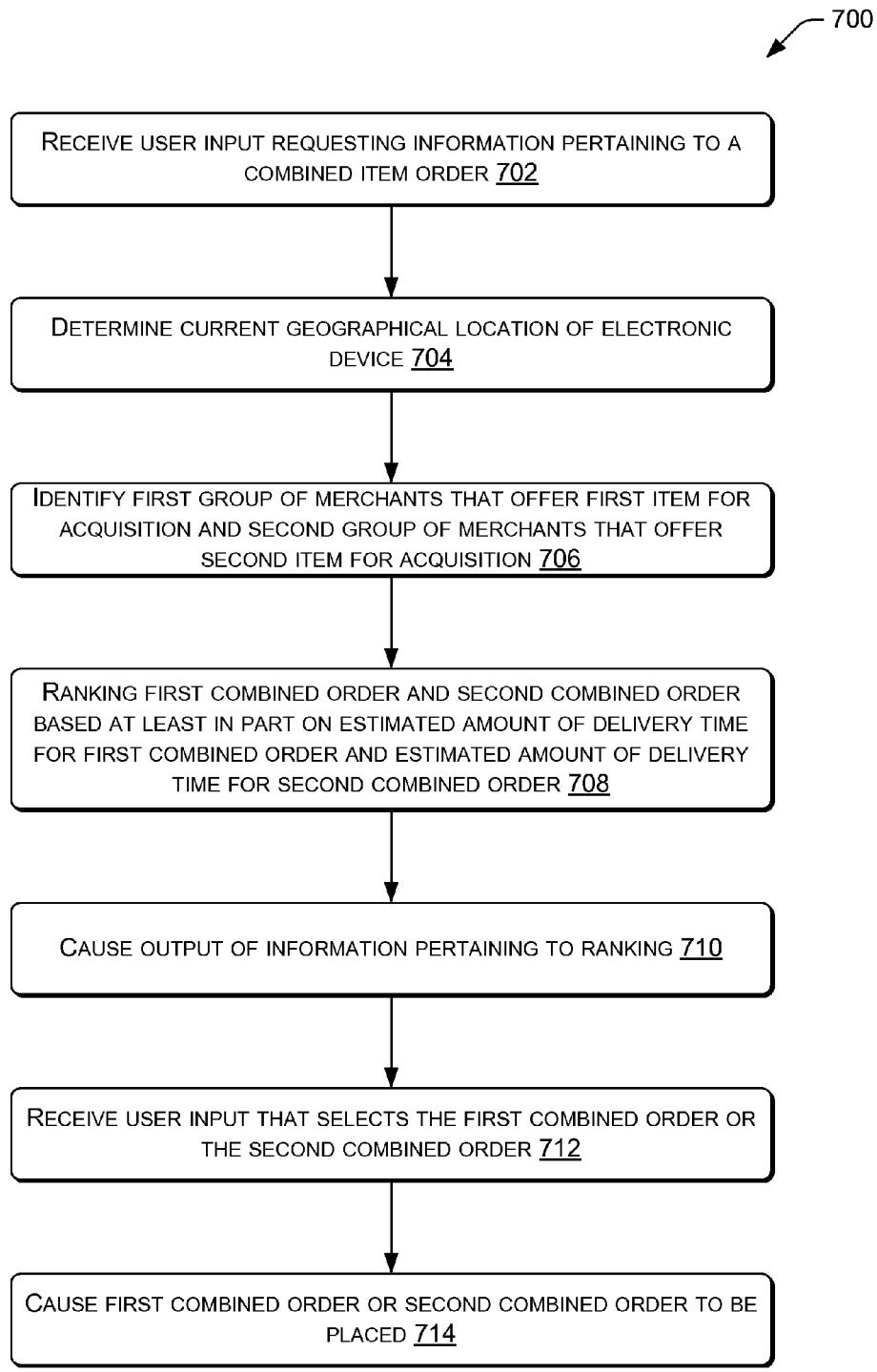
FIG. 7 illustrates an example process for ranking combined item orders based on respective amounts of times of delivery.

FIGS. 5, 6, and 7 illustrate example processes 500, 600, and 700 for employing the techniques described herein. For ease of illustration the processes 500, 600, and 700 are described as being performed in the architecture 100 of FIG. 1. For example, one or more of the individual operations of the processes 500, 600, and 700 may be performed by the service provider 102, the electronic device 106, and/or the POS device 110. However, the processes 500, 600, and 700 may be performed in other architectures. Moreover, the architecture 100 may be used to perform other processes.

The processes 500, 600, and 700 (as well as each process described herein) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any number of the individual operations may be omitted.

FIG. 5 illustrates the example process 500 for ranking an item for each of multiple merchants that offer the item for acquisition.

At 502, the service provider 102 cause display of a user interface via the electronic device 106 to enable a user to place an order for an item.

At 504, the service provider 102 may receive user input requesting information pertaining to merchants that offer a specified item for acquisition. The user input may be received from the electronic device 106. In some instances, the user input is provided via the user interface.

At 506, the service provider 102 may determine a current geographical location of the electronic device 106. The current geographical location may be determined in a variety of manners, including receiving information from the electronic device 106 or a location-based service identifying the current geographical location, receiving cell tower information or wireless access point information from the electronic device 106 or a location-based service identifying a cell tower or wireless access point that the electronic device 106 has communicated with recently (e.g., over a previous period of time), and so on. In some instances, a current geographical location of the electronic device 106 may be monitored over time.

At 508, the service provider 102 may identify merchants that offer the specified item for acquisition. In some instances, this includes identifying merchants that are located within a threshold distance to the current geographical location of the electronic device 106 and/or within a geo-fence for the electronic device 106.

At 510, the service provider 102 may determine item-level information for the specified item for each of the identified merchants. This may include determining, for each of the identified merchants, a cost at which the specified item is being offered for acquisition at the respective merchant, a rating of the specified item for the respective merchant, an attribute of the specified item for the respective merchant, an estimated amount of delivery time to deliver the specified item for the respective merchant, or any other item-level information. In some instances, an attribute of an item may relate to a category of the specified item, such as a number of calories for a food item.

At 512, the service provider 102 may rank or sort the specified item for each of the identified merchants. The ranking or sorting may be based on the respective costs, the respective ratings, the respective attributes, the respective number of calories, the respective estimated amount of delivery time, or any other item-level information for the respective merchant.

In some instances, the ranking or sorting at 512 may be based on a sub-range of an item attribute. For example, the service provider 102 may determine a range of costs at which the specified item is being offered for acquisition within a geographical region. The geographical region may be defined by a geo-fence surrounding the geographical location of the electronic device 106 or a boundary of a city, county, state, or country for the geographical location of the electronic device 106. The service provider 102 may then divide the range of the costs into sub-ranges of costs. The ranking or sorting may include assigning, for each of the identified merchants, a sub-range of costs of the multiple sub-ranges of costs to the specified item according to a cost of the specified item for the respective merchant.

At 514, the service provider 102 may cause output of information pertaining to the ranked specified item. This may include causing display of the information via the electronic device 106. The information may include a map having a visual representation for each of the identified merchants located at an establishment of the respective merchant. Each visual representation may indicate the ranking of the specified item for the respective merchant. Alternatively, or addition, the information may include a list of the identified merchants that is ordered according to the ranking. In some instances, the information indicates, for each of the identified merchants, the respective sub-range of costs or another attribute that is assigned to the specified item for the respective merchant.

At 516, the service provider 102 may receive user input requesting to order the specified item from a particular merchant of the identified merchants. The user input may be received from the electronic device 106.

At 518 the service provider 102 may cause an order of the specified item to be placed with the particular merchant. This may include contacting the particular merchant to inform the particular merchant of the placement of the order.

FIG. 6 illustrates the example process 600 for determining an amount of time to deliver a specified item to a merchant. In some instances, the process 600 is performed as part of the operation 510 of FIG. 5. Further, in some instances the process 600 is performed for each of a plurality of merchants, such as merchants that are within a predetermined proximity to a user and that offer the specified item for acquisition.

At 602, the service provider 102 may determine a preparation time for the merchant to prepare the specified item. In some instances, the preparation time is determined based on a previous amount of preparation time that was taken to prepare the specified item or another item. The other item may be deemed to have a threshold amount of similarity to the specified item (e.g., due to the items being associated with a same item category). In other instances, the preparation time is determined based at least in part on a previous amount of preparation time that was taken for the merchant or another merchant to prepare the specified item. The other merchant may be deemed to have a threshold amount of similarity to the merchant (e.g., due to the merchants being associated with a same merchant category—offering for acquisition the same categories of items).

At 604, the service provider 102 may determine a courier time for a courier to transport the specified item to the current geographical location of the electronic device 106. This determination may be based on a current location of the courier relative to a current location of the merchant. In some instances, the courier time is determined based on historical data for a distance that will be traveled by the courier. As one example, the courier time may be based on a previous amount of courier time that was taken to transport the specified item or another item a distance that is within a range of a distance that will be traveled by the courier to transport the specified item to the current geographical location of the electronic device 106. As another example, the courier time may be based on a previous amount of courier time that was taken to transport the specified item or another item. The other item may be deemed to have a threshold level of similarity to the specified item (e.g., due to the items being associated with a same category). In yet a further example, the courier time may be based on a previous amount of courier time that was taken to transport the specified item or another item for the merchant or another merchant. The other merchant may be deemed to have a threshold amount of similarity to the merchant (e.g., due to the merchants being associated with a same merchant category).

At 606, the service provider 102 may determine current traffic conditions. As one example, the traffic conditions may relate to a route from a current geographical location of the courier to the merchant. As another example, the traffic conditions may relate to a route from the merchant to the current geographical location of the electronic device 106. As such, the service provider 102 may consider traffic conditions that may affect the courier's delivery of the specified item.

At 608, the service provider 102 may determine an amount of time to deliver the specified item. The amount of time to deliver the specified item may be based on the preparation time, the courier time, the current traffic conditions, current inventory of the specified item for the merchant (e.g., an amount of time to obtain additional inventory of the specified item), an amount of time to package the specified item, and so on.

FIG. 7 illustrates the example process 700 for ranking combined item orders based on respective amounts of times of delivery.

At 702, the service provider 102 may receive user input requesting information pertaining to merchants of a combined item order that includes a first item and a second item. The user input may be received from the electronic device 106.

At 704, the service provider 102 may determine a current geographical location of the electronic device 106.

At 706, the service provider 102 may identify a first group of merchants that offer the first item for acquisition and a second group of merchants that offer the second item for acquisition. Each of the merchants from the first and second groups may be located within a predetermined proximity to the electronic device 106.

At 708, the service provider 102 may rank a first combined order and a second combined order based on an estimated amount of delivery time for each of the first combined order and the second combined order. The first combined order may include the first item from a merchant of the first group of merchants and the second item from a merchant of the second group of merchants. The second combined order may include the first item and the second item from a different combination of merchants of the first and second groups than the first combined order.

At 710, the service provider 102 may cause output of information pertaining to the ranking. For example, the service provider 102 may cause display of, via the electronic device 106, a list of the first combined order and the second combined order ranked according to a least amount of delivery time.

At 712, the service provider may receive user input that selects the first combined order or the second combined order. The user input may be received from the electronic device 106.

At 714, the service provider 102 may cause the selected combined order to be placed. This may include contacting each of the corresponding merchants of the first and second groups of merchants.

Figure 8:
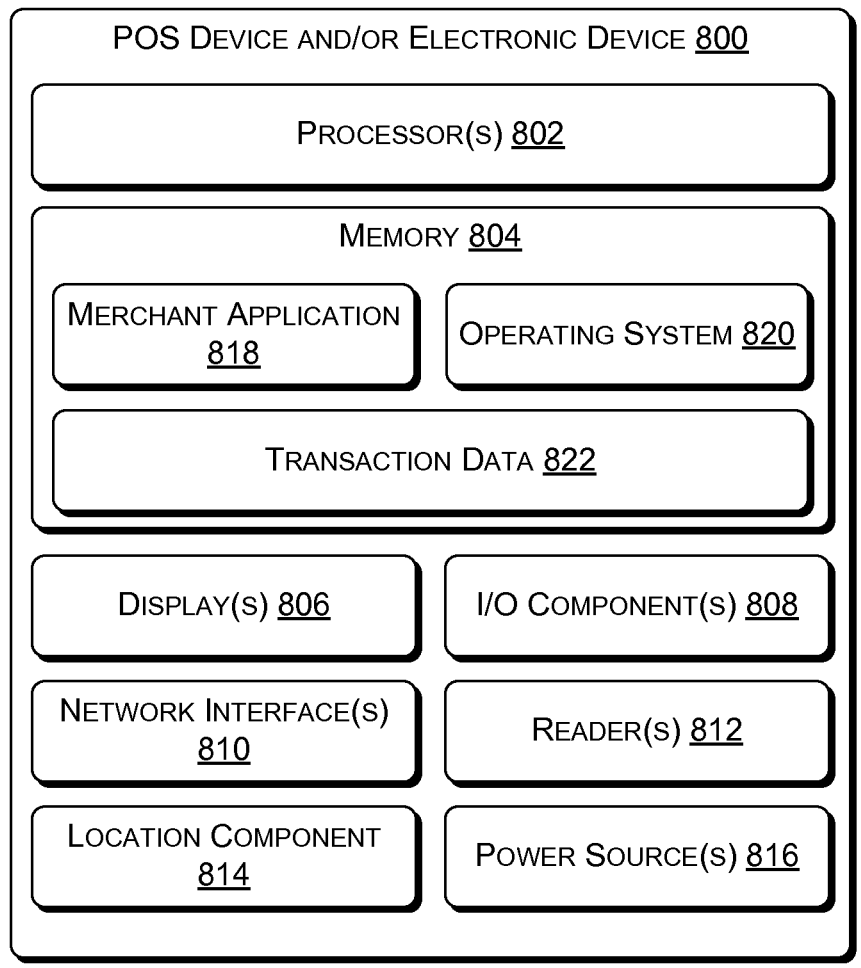
FIG. 8 illustrates example components of an example POS device and/or electronic device according to some implementations.

FIG. 8 illustrates example components of an example POS device and/or electronic device 800 (e.g., one of the POS devices 110 or the electronic device 106) according to some implementations. Further, in some instances the electronic device 800 may represent a device associated with a courier, such as the courier 114. The device 800 may be any suitable type of computing device, e.g., mobile, semi-mobile, semi-stationary, or stationary. Some examples of the device 800 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the device 800 includes one or more processors 802, memory 804, one or more displays 806, one or more input/output (I/O) components 808, one or more network interfaces 810, one or more payment instrument readers 812, at least one location component 514, and one or more power sources 816. Each of the one or more processors 802 may include a central processing unit (CPU), a graphics processing unit (GPU), a microprocessor, a microcomputer, a microcontroller, a state machine, logic circuitries, a digital signal processor, and so on. For instance, the one or more processors 802 may be one or more hardware processors and/or logic circuits of any suitable type specifically programmed or configured to execute the algorithms and processes described herein. Each of the one or more processors 802 may be a single processing unit or a number of processing units, and may include single or multiple computing units or multiple processing cores. The one or more processors 802 can be configured to fetch and execute computer-readable instructions stored in the memory 804, which can program the one or more processors 802 to perform the functions described herein.

The memory 804 (as well as all other memory discussed herein) may include volatile and nonvolatile memory and/or removable and non-removable media implemented in any type of technology for storage of information, such as computer-readable instructions, data structures, program modules, or other data. Such computer-readable media may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the device 800, the memory 804 may be a type of computer-readable storage media and/or may be a tangible non-transitory media to the extent that when mentioned, non-transitory computer-readable media exclude media such as energy, carrier signals, electromagnetic waves, and signals per se.

The memory 804 may be used to store and maintain any number of functional components that are executable by the one or more processors 802. In some implementations, these functional components comprise instructions or programs that are executable by the one or more processors 802 and that, when executed, implement operational logic for performing the actions and services attributed above to the device 800. Functional components of the device 800 stored in the memory 804 may include a merchant application 818. The merchant application 818 may present an interface on the device 800 to enable the merchant to conduct transactions, receive payments, and so forth, as well as communicating with the service provider 102 for processing payments and sending transaction information. Further, the merchant application 818 may present an interface to enable the merchant to manage the merchant's account, and the like. Additional functional components may include an operating system 820 for controlling and managing various functions of the device 800 and for enabling basic user interactions with the device 800. The memory 804 may also store transaction data 822 that is received based on the merchant associated with the device 800 engaging in various transactions with customers.

In addition, the memory 804 may also store data, data structures and the like, that are used by the functional components. For example, this data may include item information that includes information about the items offered by the merchant, which may include images of the items, descriptions of the items, prices of the items, and so forth. Depending on the type of the device 800, the memory 804 may also optionally include other functional components and data, which may include programs, drivers, etc., and the data used or generated by the functional components. Further, the device 800 may include many other logical, programmatic and physical components, of which those described are merely examples that are related to the discussion herein.

The network interface(s) 810 may include one or more interfaces and hardware components for enabling communication with various other devices over the network or directly. For example, the network interface(s) 810 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 8 further illustrates that the device 800 may include the one or more displays 806 mentioned above. Depending on the type of computing device used as the device 800, the one or more displays 806 may employ any suitable display technology. For example, the one or more displays 806 may be a liquid crystal display, a plasma display, a light emitting diode display, an OLED (organic light-emitting diode) display, an electronic paper display, or any other suitable type of display able to present digital content thereon. In some examples, the one or more displays 806 may have a touch sensor associated with the one or more displays 806 to provide a touchscreen display configured to receive touch inputs for enabling interaction with a graphic interface presented on the one or more displays 806. Accordingly, implementations herein are not limited to any particular display technology. Alternatively, in some examples, the device 800 may not include the one or more displays 806, and information may be present by other means, such as aurally.

The one or more I/O components 808, meanwhile, may include speakers, a microphone, a camera, and various user controls (e.g., buttons, a joystick, a keyboard, a keypad, etc.), a haptic output device, and so forth.

In addition, the device 800 may include or may be connectable to the one or more payment instrument readers 812 (e.g., card reader). In some examples, the one or more payment instrument readers 812 may plug in to a port in the merchant device, such as a microphone/headphone port, a data port, or other suitable port. In other instances, the one or more payment instrument readers 812 is integral with the entire device 800. The one or more payment instrument readers 812 may include a read head for reading a magnetic strip of a payment card, and further may include encryption technology for encrypting the information read from the magnetic strip. Alternatively, numerous other types of card readers may be employed with the device 800 herein, depending on the type and configuration of a particular device 800.

The location component 814 may include a GPS device able to indicate location information, or the location component 814 may comprise another other location-based sensor. The device 800 may also include one or more additional sensors (not shown), such as an accelerometer, gyroscope, compass, proximity sensor, and the like. Additionally, the device 800 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
    causing, by a computing device of a service provider that facilitates items being ordered from merchants, display of a user interface via a mobile device associated with a user, the user interface enabling the user to place an order for an item;
    receiving, by the computing device and via the user interface, user input requesting information pertaining to merchants that offer a specified item for acquisition;
    determining, by the computing device and based on a signal received at least partly over a cellular network from the mobile associated with the user, a current geographical location of the mobile device;
    identifying, by the computing device, a first merchant and a second merchant that each offer the specified item for acquisition, the first merchant and the second merchant being identified based on location information received at the computing device from a respective point of sale device associated with each of the first merchant and the second merchant, each one of the first merchant and the second merchant having a respective establishment located within a threshold distance of the current geographical location of the mobile device;
    retrieving, by the computing device and for each of the first merchant and the second merchant, cost data from a menu of an online site associated with the respective merchant;
    determining, by the computing device and for each of the first merchant and the second merchant, a cost at which the specified item is being offered for acquisition at the respective merchant based at least in part on the cost data for the respective merchant;
    retrieving, by the computing device and for each of the first merchant and the second merchant, at least one of rating data or attribute data from an online source;
    determining, by the computing device and for each of the first merchant and the second merchant, at least one of:
        a rating of the specified item for the respective merchant based at least in part on the rating data for the respective merchant; or
        an attribute of the specified item for the respective merchant that is related to a category of the specified item based at least in part on the attribute data for the respective merchant;
    determining, for each of the first merchant and the second merchant, a value for the respective merchant based on the cost of the specified item for the respective merchant and at least one of the rating of the specified item for the respective merchant or the attribute of the specified item for the respective merchant;
    ranking, by the computing device, the specified item for each of the first merchant and the second merchant based at least in part on the value for the first merchant and the value for the second merchant;
    sending, by the computing device and at least partly over the cellular network, the ranking to the mobile device to be output via the user interface;

receiving, by the computing device and via the user interface, user input requesting to order the specified item from the first merchant; and sending instructions, by the computing device and to the respective point of sale device of the first merchant, to place an order of the specified item with the first merchant.

2. The method of claim 1, further comprising:

determining a range of costs at which the specified item is being offered for acquisition within a geographical region; and dividing the range of the costs into sub-ranges of costs;

wherein the ranking includes ranking the specified item for each of the first merchant and the second merchant according to the sub-ranges of costs.

3. The method of claim 2, wherein the geographical region is defined by at least one of a geo-fence surrounding the current geographical location of the mobile device or a boundary of a city, county, state, or country for the current geographical location of the mobile device.

4. The method of claim 1, wherein the attribute of the specified item comprises a number of calories of the specified item.

5. The method of claim 1, further comprising causing display of a map having a visual representation for each of the first merchant and the second merchant located at the establishment of the respective merchant, each visual representation indicating the ranking of the specified item for the respective merchant.

6. One or more non-transitory computer-readable media comprising executable instructions that, when executed by one or more processors of a computing device of a service provider that facilitate items being ordered from merchants, cause the one or more processors to:

cause display of a user interface via a mobile device associated with a user, the user interface enabling the user to place an order;

receive, via the user interface, user input requesting information pertaining to merchants that offer a specified item for acquisition;

determine, based on a signal received at least partly over a cellular network from the mobile associated with the user, a current geographical location of the mobile device;

identify a first merchant and a second merchant that each offer the specified item for acquisition, the first merchant and the second merchant being identified based on location information received at the computing device from a respective point of sale device associated with each of the first merchant and the second merchant, each one of the first merchant and the second merchant having a respective establishment located within a threshold distance of the current geographical location of the mobile device;

determine, for each of the first merchant and the second merchant, a cost at which the specified item is being offered for acquisition at the respective merchant;

retrieve, for each of the first merchant and the second merchant, at least one of rating data or attribute data from an online source;

determine, for each of the first merchant and the second merchant, at least one of:

a rating of the specified item for the respective merchant based at least in part on the rating data for the respective merchant; or an attribute of the specified item for the respective merchant that is related to a category of the specified item based at least in part on the attribute data for the respective merchant;

determine, for each of the first merchant and the second merchant, a value for the respective merchant based on the cost of the specified item for the respective merchant and at least one of the rating of the specified item for the respective merchant or the attribute of the specified item for the respective merchant;

rank the specified item for each of the first merchant and the second merchant based at least in part on the value for the first merchant and the value for the second merchant to yield a ranking;

send, at least partly over a cellular network, the ranking to the mobile device to be output via the user interface;

receive, via the user interface, user input requesting to order the specified item from the first merchant; and send instructions to the respective point of sale device of the first merchant to place an order of the specified item with the first merchant.

7. The one or more non-transitory computer-readable media of claim 6, wherein the execution of the instructions further cause the one or more processors to:

determine a range of costs at which the specified item is being offered for acquisition within a geographical region;

determine multiple sub-ranges of costs for the range of the costs; and rank the specified item for each of the first merchant and the second merchant according to the sub-ranges of costs.

8. The one or more non-transitory computer-readable media of claim 7, wherein the execution of the instructions further cause the one or more processors to cause display of information that indicates the sub-ranges of costs.

9. The one or more non-transitory computer-readable media of claim 6, wherein the attribute comprises a number of calories of the specified item for the respective merchant.

10. The one or more non-transitory computer-readable media of claim 6, wherein the execution of the instructions further cause the one or more processors to:

receive transaction information from the first merchant and the second merchant; and determine the cost at which the specified item is being offered for acquisition by the respective merchant based at least in part on the transaction information for the respective merchant.

11. A service provider system configured to facilitate items being ordered from merchants, the service provider system comprising:

one or more processors; and memory communicatively coupled to the one or more processors and storing instructions that, when executed by the one or more processors, cause the one or more processors to:

cause display of a user interface via a mobile device associated with a user, the user interface enabling the user to place an order;

receive, via the user interface, user input requesting information pertaining to merchants that offer a specified item for acquisition;

determine, based on a signal received at least partly over a cellular network from the mobile associated with the user, a current geographical location of the mobile device;

identify a first merchant and a second merchant that each offer the specified item for acquisition, the first merchant and the second merchant being identified based on location information received at the service provider system from a respective point of sale device associated with each of the first merchant and the second merchant, each one of the first merchant and the second merchant having a respective establishment located within a threshold distance of the current geographical location of the mobile device;

determine, for each of the first merchant and the second merchant, a cost at which the specified item is being offered for acquisition at the respective merchant;

retrieve, for each of the first merchant and the second merchant, at least one of rating data or attribute data from an online source;

determine, for each of the first merchant and the second merchant, at least one of:
- a rating of the specified item for the respective merchant based at least in part on the rating data for the respective merchant; or
- an attribute of the specified item for the respective merchant that is related to a category of the specified item based at least in part on the attribute data for the respective merchant;

determine, for each of the first merchant and the second merchant, a value for the respective merchant based on the cost of the specified item for the respective merchant and at least one of the rating of the specified item for the respective merchant or the attribute of the specified item for the respective merchant;

rank the specified item for each of the first merchant and the second merchant based at least in part on the value for the first merchant and the value for the second merchant to yield a ranking;

send the ranking to the mobile device to be output via the user interface;

receive, via the user interface, user input requesting to order the specified item from the first merchant; and send instructions to the respective point of sale device of the first merchant to place an order of the specified item with the first merchant.

12. The service provider system of claim 11, wherein the one or more processors are further configured to execute the instructions to send information to the mobile device to be output via the user interface, the information indicating a cost range associated with the specified item for the first merchant.

13. The service provider system of claim 11, wherein the one or more processors are further configured to execute the instructions to send information to the mobile device to be output via the user interface, the information indicating a calorie range associated with the specified item for the first merchant.

14. The service provider system of claim 11, wherein the ranking is output on the user interface on a map with a visual representation for the first merchant and the second merchant located at an establishment of the respective merchant.

15. The service provider system of claim 11, wherein the ranking is output on the user interface in a list, the first merchant and the second merchant being ordered in the list according to the ranking.

16. The service provider system of claim 11, wherein the one or more processors are further configured to execute the instructions to:
receive transaction information from the first merchant and the second merchant; and
determine the cost at which the specified item is being offered for acquisition by the respective merchant based at least in part on the transaction information for the respective merchant.

17. The service provider system of claim 11, wherein the attribute comprises a number of calories of the specified item for the respective merchant.

18. The method of claim 1, further comprising:
determining, for each of a plurality of couriers, a geographical location of a courier device associated with the respective courier; and
estimating, for each of the first merchant and the second merchant, an amount of time to deliver the specified item to the current geographical location of the mobile device if the specified item were ordered from the respective merchant;
wherein the ranking is based at least in part on the amount of time estimated for each of the first merchant and the second merchant to deliver the specified item to the current geographical location of the mobile device.

19. The one or more non-transitory computer-readable media of claim 6, wherein the execution of the instructions further cause the one or more processors to:
determine, for each of a plurality of couriers, a geographical location of a courier device associated with the respective courier; and
estimate, for each of the first merchant and the second merchant, an amount of time to deliver the specified item to the current geographical location of the mobile device if the specified item were ordered from the respective merchant;
wherein the ranking is based at least in part on the amount of time estimated for each of the first merchant and the second merchant to deliver the specified item to the current geographical location of the mobile device.

20. The service provider system of claim 11, wherein the one or more processors are further configured to execute the instructions to:
determine, for each of a plurality of couriers, a geographical location of a courier device associated with the respective courier; and
estimate, for each of the first merchant and the second merchant, an amount of time to deliver the specified item to the current geographical location of the mobile device if the specified item were ordered from the respective merchant;
wherein the ranking is based at least in part on the amount of time estimated for each of the first merchant and the second merchant to deliver the specified item to the current geographical location of the mobile device.

* * * * *